Dec. 25, 1951  F. WHITTLE  2,580,207
JET PIPE FOR JET-PROPELLED AIRCRAFT
Filed Aug. 24, 1945  3 Sheets-Sheet 1

Inventor
FRANK WHITTLE
By Stevens and Davis
Attorneys

Dec. 25, 1951  F. WHITTLE  2,580,207
JET PIPE FOR JET-PROPELLED AIRCRAFT
Filed Aug. 24, 1945  3 Sheets-Sheet 2

*Inventor*
*FRANK WHITTLE*
By Stevens and Davis
*Attorneys*

Dec. 25, 1951  F. WHITTLE  2,580,207
JET PIPE FOR JET-PROPELLED AIRCRAFT

Filed Aug. 24, 1945  3 Sheets-Sheet 3

*Inventor*
*FRANK WHITTLE*
By *Stevens and Davis*
*Attorneys*

Patented Dec. 25, 1951

2,580,207

UNITED STATES PATENT OFFICE 2,580,207

JET PIPE FOR JET-PROPELLED AIRCRAFT

Frank Whittle, Rugby, England, assignor to Power Jets (Research & Development) Limited, London, England Application August 24, 1945, Serial No. 612,469
In Great Britain May 13, 1942

Section 1, Public Law 690, August 8, 1946
Patent expires May 13, 1962

6 Claims. (Cl. 60—35.6)

This invention relates to aircraft propulsion power plant installations of the jet propulsion class in which the propulsive effort is primarily dependent upon the magnitude of the mass flow of the exhaust from the power unit of the installation (this power unit usually taking a form of a turbine driven compressor group). The invention is concerned with the case in which the power unit and its exhaust duct are enclosed by a nacelle which becomes pressurized in flight due to the ram effect and forms a plenum chamber from which the power unit takes its air supply. There are some practical difficulties associated with the construction and mounting of the actual ducting which, acting as an exhaust pipe, finally leads the propulsive gases to the atmosphere. These difficulties, which are intimately related to the size of the ducting necessitated by the magnitude of the mass flow required to produce an effective amount of thrust and the need to minimize dismantling of the nacelle for the removal of the power unit, include those associated with thermal changes of dimension, the fact that conditions of aircraft installation have to be met and the fact that it is desirable in an aircraft installation to minimize the time and labour required in installing or removing the engine or power unit. It may also be an advantage to be able, upon such removal to leave the exhaust pipe in situ in the aircraft; if for example there is lagging to be considered, this should be left as far as possible undisturbed. Moreover, in certain design or operative conditions there is advantage in permitting or causing some relatively small rate of flow of air into the exhaust pipe. For example, there are flight conditions (e. g., a dive with engine off) in which an inwardly acting pressure difference may exist due to a depression in the exhaust pipe with concurrent maintenance of pressure in the nacelle or plenum chamber tending to crush the pipe and since the pipe may otherwise require substantial and heavy reinforcement to meet this condition, the invention may result in reduction of weight by reducing this tendency; the effect may be enlarged by the fact that in such case, the pipe being cooled will be contracted and a greater air gap may thereby be provided than in "engine on" cases.

The invention seeks to provide a construction and installation meeting in a large degree the practical requirements in a simple and effective manner. It is to be considered that in each case where the invention is applied there is some form of power unit generating the propulsive flow of gas and that this emerges from the unit through a nozzle or duct constructionally forming virtually a part of the unit.

According to this invention, an exhaust pipe for the purpose stated has a circumferential break or interruption in its wall such as to permit flow of air into the pipe, the break or interruption being such as to facilitate installation or removal of one section of the pipe with the other part in situ without any substantial axial displacement of either part. According to another aspect of the invention an exhaust pipe for the purpose stated comprises a section of pipe substantially permanently associated with the air frame and plenum chamber and another section substantially permanently associated with the power unit, these sections being arranged and adapted to register endwise when the unit is installed in the airframe, an air gap being then left between or in the region on the adjacent ends of the sections.

It has previously been suggested in relation to jet propulsion apparatus, to provide in a jet system a series of coaxial injector-like annular openings in series, with the object of inducing a flow of propulsive fluid into the jet stream. The present invention is not primarily concerned with the induction of a flow of air into the jet stream, although this arises in a secondary way and may be advantageous in certain circumstances. In so far as inward flow of air in all conditions of operation may be designed for, it is rather in the sense of ensuring as far as possible that there shall be no outward flow.

The invention also includes a construction of coupling preferably to be adopted for the ends of registering pipe sections for the purpose stated, in which the ends are enabled to be maintained in their proper relationship and in which the necessity for great accuracy of manufacture, alignment or pipe suspension, is not called for, whilst providing at the same time for thermal effects. The invention is illustrated in the accompanying drawings wherein.

Figure 1:
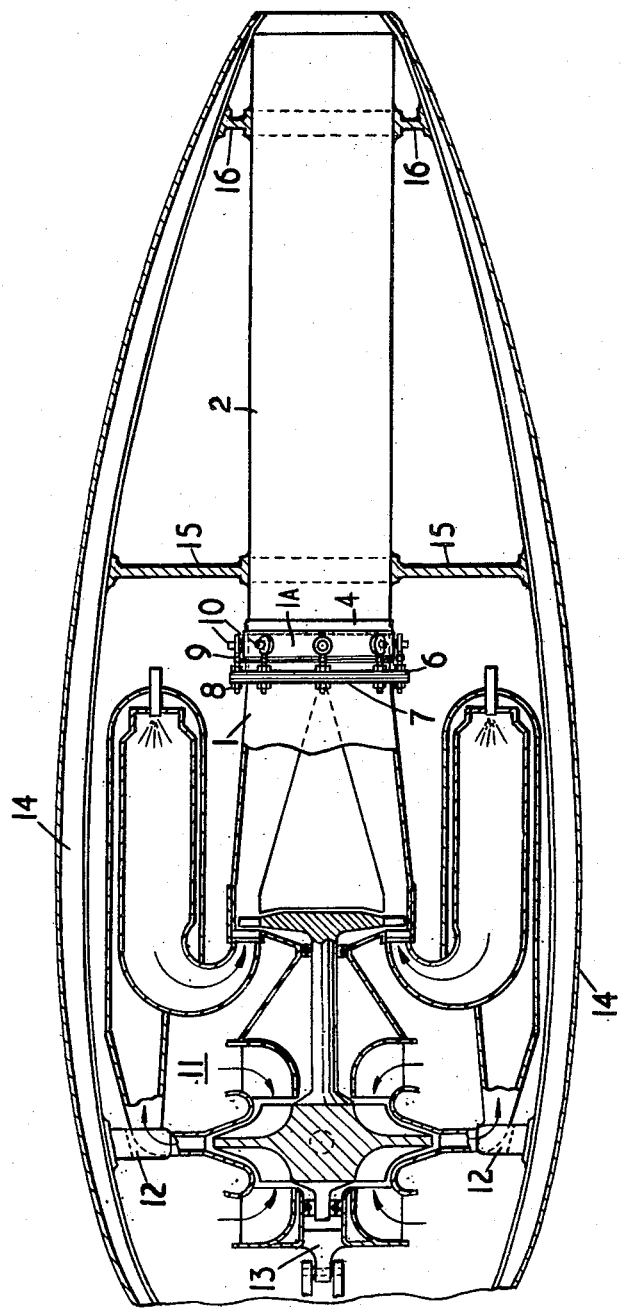
Figure 1 is a diagrammatic illustration of a typical gas turbine installation of the Whittle type with a two-section exhaust duct with a modified coupling.
Figure 7:
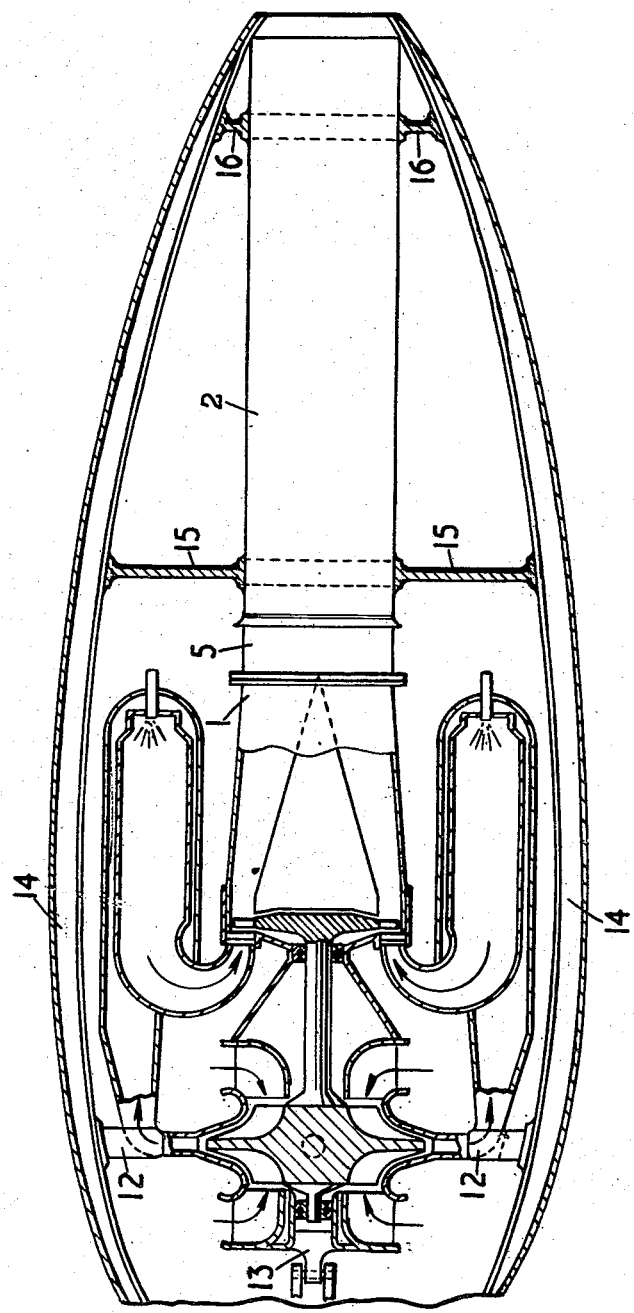
Figure 7 is a diagrammatic illustration of a typical gas turbine installation of the Whittle type with a two-section exhaust duct with gap for simple installation of the gas turbine.

In the following description the invention will be considered as applied to a gas turbine jet propulsion unit as illustrated in Figures 1 and 7, in which 11 generally indicates the power unit, 12 a pair of diametrically extending trunnions seating in bearers on the airframe, 13 an anchorage preventing tilting of the power unit about the trunnion axis and 14 a nacelle enclosing the power unit and its exhaust pipe. This nacelle is assumed to have a forwardly facing intake and so to become pressurized in flight. The power units being enclosed in the nacelle, the latter forms a plenum chamber from which the power unit draws its air supply.

Figure 2:
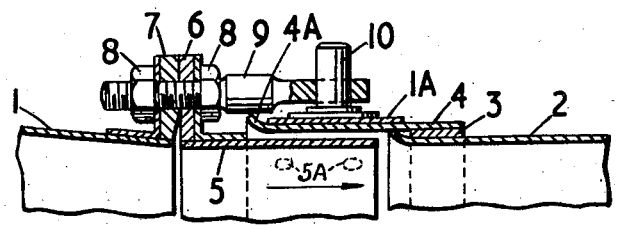
Figure 2 is a fragmentary sectional view showing the nature of the two-section duct with modified coupling of Figure 1.
Figure 3:
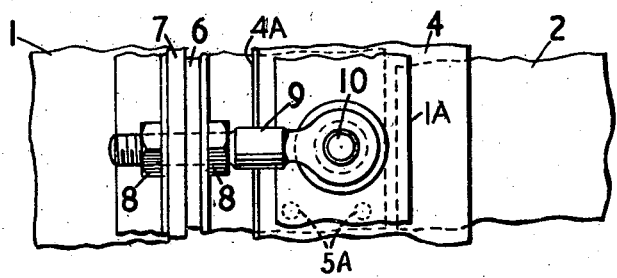
Figure 3 is a fragmentary external view of the coupling of Figure 2.

The pipe sections are represented by 1 and 2. The section 1 which is slightly conical is that which is regarded as a part of the power unit; it is intended to be removable with the power unit. The section 2 is a part of a smooth walled cylindrical exhaust pipe permanently installed in the airframe and intended to be mounted or suspended therein by suitable means, an bearer members 15, and 16 preferably including linkage or the like to allow for thermal expansion. The bearer members 15 and 16 form no part of the present invention but are common in the art to which this invention appertains. It is to be appreciated that the exhaust pipe as a whole reaches high temperatures, whilst the airframe structure may remain cold and there is also a possible converse condition which may arise for example from shutting down the unit on the ground when the airframe structure may become hotter than the pipe. The direction of exhaust flow in the pipe is indicated by the arrow in Figs. 2 and 4. The upstream end of the section 2 is outwardly flared at 1a and surrounding the pipe behind this flare is a ring 3 which may be of metal or of heat resistant packing material, to which ring is attached a short cylindrical sleeve 4, the forward end of which is flared as shown at 4A. The structure 3, 4 is arranged to be a reasonably close though sliding fit on the section 2. The section 1 has a downstream cylindrical extension 5 which may conveniently be attached to it by the flange arrangement shown at 6, 7 secured by nuts 8 on the shanks of eye-bolts 9, the eyes of which engage radially projecting pins 10 attached to the sleeve 4. Between the inner wall of the sleeve 4 and the outer surface of the extension 5 is an air gap. The internal diameter of the extension 5 is the same or slightly greater than the internal diameter of the section 2 so that the arrangement affords a slight (though preferably very slight) injector effect, the gas stream in the pipe inducing a flow of air through the gap into the pipe.

When it is required to remove the power unit without disturbing the downstream section 2 the forward nuts 8 are removed and the sleeve 4 can thereupon be slid rearwardly until it clears section 5. For the sake of convenience, section 5 may now be allowed to be removed or arrangements may be made between the flanges 6, 7 to continue to hold it in position at the section 1. With the sleeve 4 slid clear, there is nothing to prevent the vertical removal of the power unit; if the extension 5 be removed there is evidently more latitude for inadvertent movement of the power unit during lifting.

Figure 4:
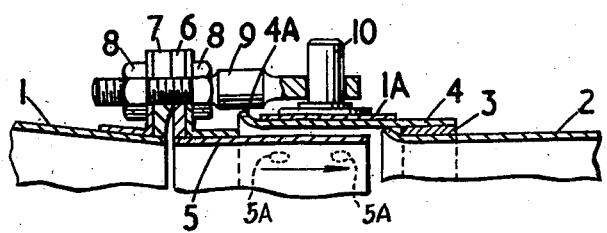
Figure 4 is a fragmentary view of a modification of Figure 2.
Figure 5:
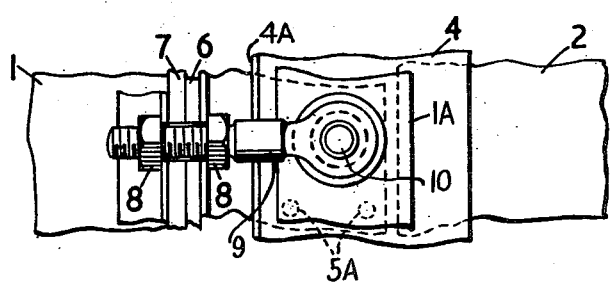
Figure 5 is a fragmentary external view of the modification in Figure 4.
Figure 6:
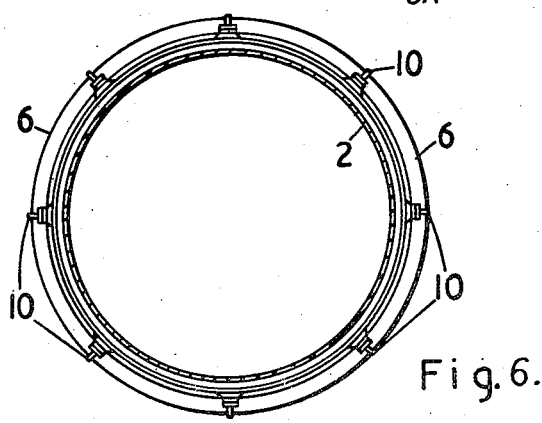
Figure 6 is a cross-section of the duct.

Should it be required, the arrangement of the nuts 8 enables the location of the sleeve 4 to be varied, though as at present intended, the ring 3 will normally draw up to the flare 1A to prevent undesired leakage. Spacing means, see Figures 2, 3, 4 and 5 in the form of small ribs or dimples 5A may be provided between 4 and 5 to maintain concentricity, though it has been found that this does not appear to be a very critical matter. Indeed it is an advantage of this device that no highly critical conditions appear to exist, so that it may not matter greatly what the air gap is or precisely how it is disposed and it may vary between a comparatively trivial leakage into the pipe (though this should preferably be uniform circumferentially) up to quite an appreciable clearance say of the order of ⅛" radially on a pipe of about 12" diameter. Instead of the shanks of the eye-bolts 9 passing through holes in the flanges 6, 7, the flanges may be radially slotted, as indicated in Figs. 4 and 5 enabling the bolts to be withdrawn radially for detachment instead of having to have a nut completely removable from each.

Another and much simplified embodiment of the invention is shown in Figure 1. In this embodiment of the invention the section 2 with its flared end 1A is located in the airframe by means as bearer members 15 and 16 of the like (Figure 7) ensuring that its upstream end remains approximately in a fixed location with respect to the power unit, and the section 1 terminates at its downstream end with or without an extension 5 and the remaining elements 3, 4, 9, 10, are omitted altogether. This simplification assumes that when the power unit is installed, its trunnion mountings and pivot mounting 12, 13, respectively (Fig. 4) permits the exhaust section 1 to be made to register with sufficient accuracy with the flared end of the section 2 with which however, it has no further connection; there is thus nothing to be attached in installation.

I claim:

1. An aircraft propulsion power plant installation of the jet propulsion class in which the propulsive effort is primarily dependent upon the magnitude of the mass flow of the exhaust from the power unit of the installation, and comprising in combination a power unit to generate said flow, a plenum chamber enclosing said power unit and from which said unit takes its air supply, said chamber becoming pressurized due to ram effect in flight conditions, and an exhaust duct receiving and discharging said flow as a propulsive jet and also enclosed by and exposed to the pressure in said plenum chamber, in which said exhaust or jet pipe comprises an upstream section and a downstream section the adjacent ends of which are of like diameter, means for mutually supporting said sections so that the downstream end of the upstream section and the upstream end of the downstream section are coaxial and axially spaced apart whereby a circumferential gap is left between said ends for the ingress of air from said plenum chamber to said duct, and a sleeve arranged externally to closely surround and be slidable on one section and adapted to surround said gap and spacedly overlap the end of the alternative section whilst providing an inlet for air from the plenum chamber to the duct.

2. Apparatus according to claim 1, in which the said sleeve constitutes a medium of mutual support between the said pipe sections.

3. Apparatus according to claim 1, in which the upstream end of the downstream section of pipe is outwardly flared and the said sleeve in one extreme sliding position bears against such flare.

4. An aircraft propulsion power plant installation of the jet propulsion class in which the propulsive effort is primarily dependent upon the magnitude of the mass flow of the exhaust from the power unit of the installation, and comprising in combination a power unit to generate said flow, a plenum chamber enclosing said power unit and from which said unit takes its air supply, said chamber becoming pressurized due to ram effect in flight conditions, and an exhaust duct receiving and discharging said flow as a propulsive jet and also enclosed by and exposed to the pressure in said plenum chamber, said exhaust or jet duct comprising separate coaxially aligned upstream and downstream sections whose adjacent ends are of like diameter, the upstream section being associated with the power unit to form for installation purposes a part thereof; and coupling means detachably connecting said sections at their adjacent ends while leaving a passage for the ingress of air from said plenum chamber to said duct and while permitting removal of one section without the other in a direction transverse to the duct axis, said coupling means including a sleeve embracing and axially slidable on the one section and adapted to be slid to and from a position in which it surrounds and forms an air entry passage with the adjacent end of the other section, and means for locking said sleeve at said position to said other section.

5. An aircraft jet propulsion power plant as claimed in claim 4, in which said coupling means further comprises axially directed bolts on and slidable with the said sleeve, and means for locking said bolts to said other duct section.

6. An aircraft propulsion power plant installation of the jet propulsion class comprising in combination a plenum chamber which in flight conditions becomes pressurized due to ram effect, a power unit within said chamber for utilizing the pressurized air therein for producing a flow of exhaust gas to constitute a propulsive jet, an exhaust or jet pipe arranged within said chamber where it is exposed to said air pressure to extend from said power unit to the exterior of said chamber for discharging said exhaust gas as a propulsive jet comprising two sections in axial alignment and axially spaced apart to provide a small gap therebetween for the ingress of said air from said chamber, one being an upstream section associated with said power unit to form for installation and removal purposes a part thereof and the other being a downstream section associated with said chamber and supported thereby to form for installation and removal purposes a part thereof and provided with a flared end for easy register with said upstream section.

FRANK WHITTLE.

REFERENCES CITED

The following references are of record in the file of this patent:

UNITED STATES PATENTS

| Number | Name | Date |
|---|---|---|
| 279,269 | Norwood | June 12, 1883 |
| 478,496 | Aird | July 5, 1892 |
| 518,680 | Scott | Apr. 24, 1894 |
| 542,864 | Thomas | July 16, 1895 |
| 1,143,321 | Robinson | June 15, 1915 |
| 1,347,660 | Reiband | July 27, 1920 |
| 1,441,211 | Byrnes | Jan. 9, 1923 |
| 1,458,523 | Coutant | June 12, 1923 |
| 1,705,492 | Noble | Mar. 19, 1929 |
| 1,938,537 | Davis | Dec. 5, 1933 |
| 2,293,632 | Sauer | Aug. 18, 1942 |
| 2,375,091 | Eiss et al. | May 1, 1945 |
| 2,473,356 | Birmann | June 14, 1949 |

FOREIGN PATENTS

| Number | Country | Date |
|---|---|---|
| 138,151 | Great Britain | Feb. 5, 1920 |